United States Patent
Matsubara

[11] Patent Number: 5,736,728
[45] Date of Patent: Apr. 7, 1998

[54] NON CONTACT IC CARD AND A NON CONTACT IC CARD SYSTEM

[75] Inventor: Toshiyuki Matsubara, Hyogo, Japan

[73] Assignees: Mitsubishi Electric Semiconductor Software Co., Ltd., Hyogo; Mitsubishi Denki Kabushiki Kaisha, Tokyo, both of Japan

[21] Appl. No.: 575,044

[22] Filed: Dec. 19, 1995

[30] Foreign Application Priority Data

Aug. 25, 1995 [JP] Japan ................... 7-217189

[51] Int. Cl.⁶ .................. G06K 19/06; G06K 5/00
[52] U.S. Cl. .................................. 235/492; 235/380
[58] Field of Search .................. 346/492, 431, 346/449, 375, 385; 327/142, 143

[56] References Cited

U.S. PATENT DOCUMENTS

| | | | |
|---|---|---|---|
| 4,818,855 | 4/1989 | Mongeon et al. | 235/492 |
| 5,068,521 | 11/1991 | Yamaguchi | 235/492 |
| 5,182,442 | 1/1993 | Takahira | 235/492 |
| 5,313,112 | 5/1994 | Macks | 327/142 X |
| 5,326,965 | 7/1994 | Inoue | 235/492 |
| 5,523,710 | 6/1996 | Miyake et al. | 327/142 X |
| 5,534,804 | 7/1996 | Woo | 327/143 |
| 5,543,741 | 8/1996 | Purits | 327/142 X |

FOREIGN PATENT DOCUMENTS

| | | | |
|---|---|---|---|
| 9153188 | 9/1964 | Japan | 327/142 |
| 2301320 | 12/1990 | Japan | 327/142 |
| 4192091 | 7/1992 | Japan . | |
| 2186142 | 6/1967 | United Kingdom | 327/142 |
| 3011509 | 6/1993 | WIPO | 235/492 |

*Primary Examiner*—Donald T. Hajec
*Assistant Examiner*—Thien Minh Le
*Attorney, Agent, or Firm*—Leydig, Voit & Mayer

[57] ABSTRACT

In a non contact IC card for generating a power supply voltage from electric waves transmitted via wireless communication from a base unit, a reset signal generating circuit is provided to reset the internal circuits when the power supply voltage rises to a predetermined operating voltage and when it is lowered below a minimum voltage of voltages which ensure the normal operation of the internal circuits, thereby operations such as a writing operation in the internal circuits can be made stable and the time required for communication can be shortened.

9 Claims, 11 Drawing Sheets

NON CONTACT IC CARD AND A NON CONTACT IC CARD SYSTEM

BACKGROUND OF THE INVENTION

1. Field of the Invention

The present invention relates to a non contact IC card such as an IC card available as a lift card used in a ski area, for example, and a non contact IC card system.

2. Description of the Related Art

FIG. 11 is a block diagram showing an exemplary prior art non contact IC card system, a part of which is disclosed in, for example, Japanese Patent Publication (Kokai) 4-192091. In the figure, reference numeral 1 represents a host computer, 2 a reader/writer (hereinafter referred to as R/W) electrically connected to the host computer 2 through a cable or the like, and 3 a non contact IC card for sending and receiving data by the use of electric waves or the like without having any electrical contact with the R/W 2. In the R/W 2, 21 denotes a control unit, 22 a modulator/demodulator circuit, and 23 a transmitting/receiving antenna. In the non contact IC card, 31 a transmitting/receiving antenna, 32 a rectifying circuit, 33 a regulation circuit, 34 a demodulator circuit, 35 a modulator circuit, 36 a control circuit, and 37 an $E^2PROM$ which is a non-volatile memory.

As non contact IC cards, there is one type which includes a power source such as a battery within the card, and another type which does not include a battery but, instead, rectifies the electric waves from the R/W 2 to generate an operating voltage. The example shown in the figure is an example of the latter case.

Next, the operation of the prior art non contact IC card system shown in FIG. 11 will be described.

The R/W 2 always generates a power carrier wave with a carrier of a constant amplitude, under the control of the host computer 1. When the non contact IC card 3 is brought to close to the R/W 2, the power transmitting wave radiated from the transmitting/receiving antenna 3 in the R/W 2 is transmitted through the transmitting/receiving antenna 31 in the non contact IC card 3 to the rectifying circuit 32. The rectifying circuit 32 rectifies the received power carrier wave to generate a d.c. voltage of, for example, 5V. The regulation circuit 32 controls the rectifying circuit 32 so that the output voltage of the rectifying circuit 32 is kept constant during receiving data. The d.c. voltage output from the rectifying circuit 32 is applied as an operating power supply voltage to various internal circuits in the non contact IC card 3.

Next, data is transmitted from the host computer 1 through the R/W 2. The data is also transmitted from the transmitting/receiving antenna 23 in the R/W 2 by phase modulation of the above-mentioned carrier. In the non contact IC card 3, the data is input through the transmitting/receiving antenna 31 into the demodulator/modulator circuit 34, and the demodulated data is input into the control circuit 36. The control circuit 36 decodes the demodulated data to perform various operations in accordance with the decoded result.

As an example of the above-mentioned operations, when an ID card is to output information, the control circuit 36 reads the ID card stored in the $E^2PROM$ 37 which is a non-volatile memory included as a data memory in the card, the demodulator/modulator circuit 35 modulates the read data and transmits the modulated data as electric waves through the transmitting/receiving antenna 31 to the R/W 2.

In another example of the above-mentioned operations, when data is to be written into the non contact IC card, the control circuit 36 executes a write instruction to write data into the $E^2PROM$ 37.

The R/W 2 is controlled by the host computer 1 so that the control unit 21 in the R/W 2 controls the demodulator/modulator circuit 22 to transmit and receive data. Namely, when data is to be transmitted from the R/W 2, the data is modulated by the modulator/demodulator circuit 22 and the modulated data is transmitted as electric waves through the transmitting/receiving antenna 23 to the non contact IC card 3. When data is to be received by the R/W 2, the electric waves received through the transmitting/receiving antenna 23 are demodulated by the modulator/demodulator circuit 22, and the demodulated data is input to the control unit 21.

Because the conventional non contact IC card and the non contact IC card system are constructed as above, the power supply voltage for operating various internal circuits in the non contact IC card is generated by the electric waves supplied from the outside. Therefore, when the electric field intensity of the electric waves received by the R/W 2 varies depending on the distance between the R/W 2 and the non contact IC card 3, there is a problem in that the operations of the various internal circuits in the non contact IC card 3 become unstable.

In addition, the non contact IC card 3 includes the $E^2PROM$ as a non-volatile memory. Therefore, to effect a write or erase operation in the $E^2PROM$, a voltage higher than a predetermined voltage is necessary. Accordingly, there is a problem in that, when the power supply voltage fluctuates, a write operation in the memory is not surely effected so that data in the memory is in danger of being destroyed.

Further, the time interval from the start time of the transmission of electric waves for supplying a power source to the start time of the transmission of command data from the R/W 2 to the non contact IC card 3 is fixed in the conventional system and includes a sufficient margin in the conventional system. For example, when the power supply voltage is generated 60 ms after the start of supplying electric wave, in order to ensure the operation of the system, 100 ms to 150 ms is taken as a margin in the conventional system. Because of this margin, them is a problem in that the communication available time is limited.

SUMMARY OF THE INVENTION

The present invention solves the above-mentioned problems, and has an object to provide a non contact IC card and a non contact IC card system in which the stable operation of the internal circuits can be achieved by providing a reset signal generating circuit within the non contact IC card so as to operate the various internal circuits only when the operating power supply voltage is higher than a predetermined value.

Another object of the present invention is to provide a non contact IC card and a non contact IC card system in which the write and erase operations in the memory can be surely effected by providing a reset signal generating circuit within the non contact IC card so as to operate the various internal circuits only when the operating power supply voltage is higher than a predetermined value.

Still another object of the present invention is to provide a non contact IC card system in which the reliability in communication can be increased and the time required in a communication can be shortened by informing a base unit of the fact that the power supply voltage in the non contact IC card exceeds the predetermined value.

To attain the above objects, according to a first aspect of the present invention, there is provided a non contact IC card comprising a reset signal generating circuit for resetting the internal circuits during a period from a time when the power supply voltage rises to a time when the power supply voltage reaches a predetermined operating voltage and during a period when the power supply voltage is below a minimum voltage in voltages which ensure a normal operation of the internal circuits during falling of the power supply voltage, and for releasing the reset during a period other than the above-mentioned period.

According to a second aspect of the present invention, there is provided a non contact IC card comprising a regulation circuit for outputting a voltage substantially equal to the power supply voltage during a period from a time when said power supply voltage rises in a power receive starting time to a time when the power supply voltage reaches a predetermined operating voltage necessary to operate the internal circuits and for maintaining the output voltage to a low level after the power supply voltage reaches the predetermined operating voltage, and for controlling the rectifying circuit by maintaining the power supply voltage to the predetermined voltage when the power supply voltage is going to exceed the predetermined voltage; and a reset signal generating circuit. The reset signal generating circuit having an intermediate voltage setting circuit for setting an intermediate voltage close to a low level, an inverter logic circuit having an input for receiving the intermediate voltage, for inverting its output when the power supply voltage is lowered below the minimum voltage ensuring the normal operation of the internal circuits during lowering of the power supply voltage, and a flip-flop having a first input for receiving the output of the inverter logic circuit, a second input for receiving the output voltage from the regulation circuit, and being operated by the power supply voltage to output a reset signal of the internal circuits.

According to a third aspect of the present invention, there is provided a non contact IC card system for effecting data transmission and reception between the non contact IC card according to the first aspect and a base unit.

According to a fourth aspect of the present invention, there is provided a non contact IC card system wherein the internal circuits in the non contact IC card comprises a control circuit for detecting that the power supply voltage reaches a predetermined operating voltage from its rising at the start time of receiving the power so as to notify it to a base unit, the base unit comprising a control unit for starting command and data transmission after receiving the notice from the control circuit.

According to a fifth aspect of the present invention, there is provided a non contact IC card system wherein the internal circuit in the non contact IC card comprises a memory in which a write operation is possible only when the power supply voltage is higher than a predetermined value, and a control circuit for detecting that the power supply voltage reaches the predetermined value to notify it to the base unit, and the base unit comprises a control unit for starting transmission of command and data after the notice is received from the control circuit.

According to a sixth aspect of the present invention, there is provided a non contact IC card system wherein the base unit comprises a control unit for requesting the non contact IC card to transmit a level of the power supply voltage, and the internal circuits in the non contact IC card compares the power supply voltage with a plurality of reference voltages in accordance with a request from the control unit, and a control circuit for informing the level of the power supply voltage to the base unit based on the compared result by the comparing means.

According to a seventh aspect of the present invention, there is provided a non contact IC card system for generating an interruption in the control circuit before the power supply voltage is lowered to reset the control circuit and the internal circuits so as to inform the control circuit of a reset state, whereby the processes in the internal circuits are finished in accordance with the interruption to inform that they will enter the reset state.

The above and further objects and novel features of the present invention will become more appeared from the following detailed description when the same is read in connection with the accompanying drawings. It is to be expressly understood, however, that the drawings are for purpose of illustration only and are not intended as a definition of the limits of the invention.

BRIEF DESCRIPTION OF THE DRAWINGS

The invention will now be described with reference to the accompanying drawings wherein.

DESCRIPTION OF THE PREFERRED EMBODIMENTS

Embodiment 1

Figure 1:
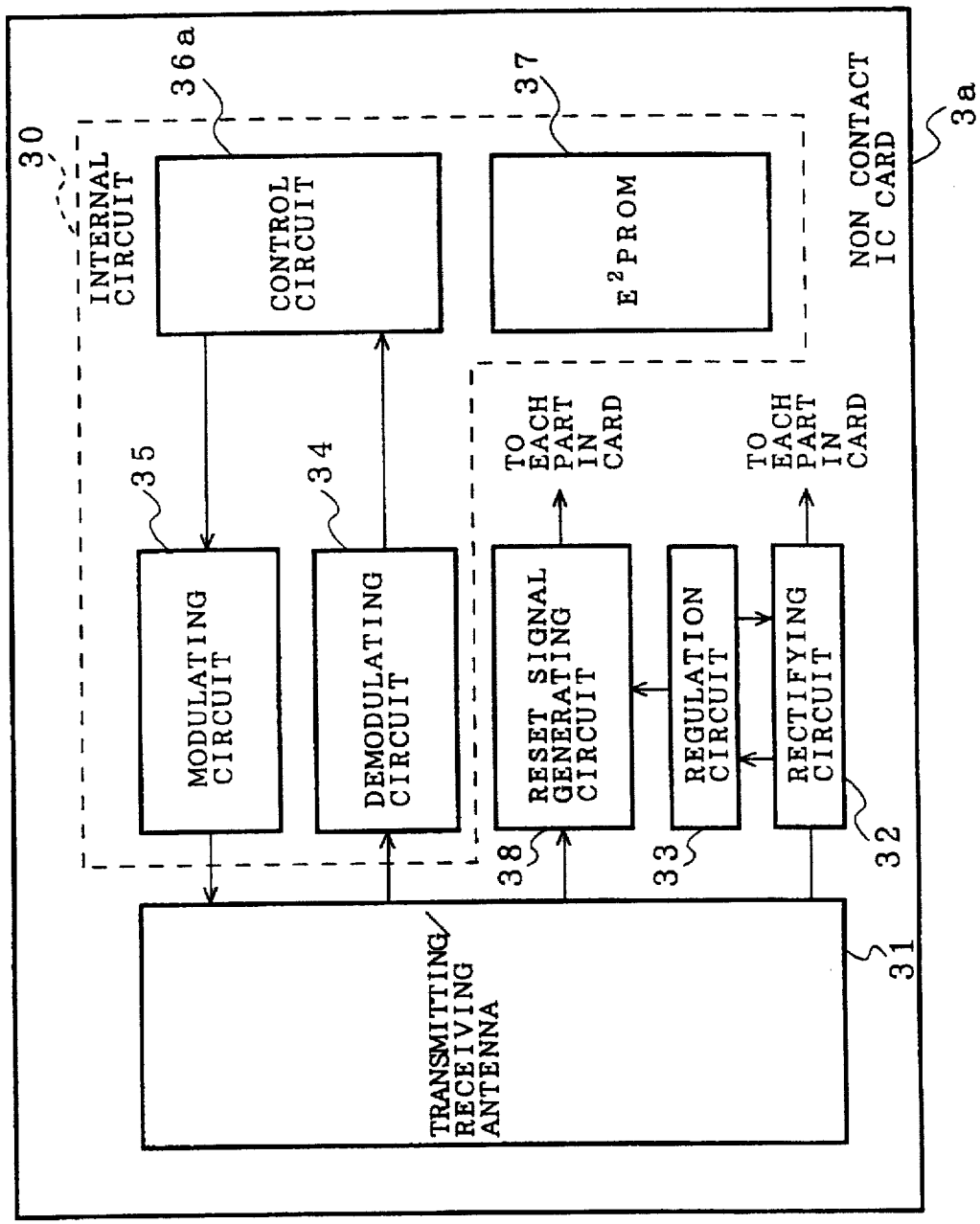
FIG. 1 is a block diagram showing the construction of a non contact IC card according to a first embodiment of the present invention.

FIG. 1 is a block diagram showing a non contact IC card according to a first embodiment of the present invention. In FIG. 1, 3a denotes a non contact IC card, 30 represents internal circuits, 31 a transmitting/receiving antenna, 32 a rectifying circuit for rectifying a power signal transmitted from the outside of the non contact IC card 3a through the transmitting/receiving antenna 31 to output a power supply voltage, 33 a regulation circuit for outputting a voltage substantially equal to the power supply voltage during a period defined from a time when the power supply voltage rises in a power receive starting time to a time when the power supply voltage reaches a predetermined operating voltage necessary to operate the internal circuits 30 and for maintaining the output voltage to a low level after the power supply voltage reaches the predetermined operating voltage, and for controlling the rectifying circuit 32 by maintaining the power supply voltage at the predetermined voltage when the power supply voltage is going to exceed the predetermined voltage; 34 a demodulating circuit, 35 a modulating circuit, 36a a control circuit, 37 an $E^2PROM$ which is a nonvolatile memory, and 38 a reset signal generating circuit for resetting the internal circuits during a period defined from a time when the power supply voltage rises at a power receive starting time to a time when the power supply voltage reaches a predetermined operating voltage and during a period when the power supply voltage is below a minimum voltage which ensures a normal operation of the internal circuits during falling of the power signal supply voltage at the end of receiving the power, and for releasing the reset during a period other than the period during which the reset is being effected.

Figure 2:
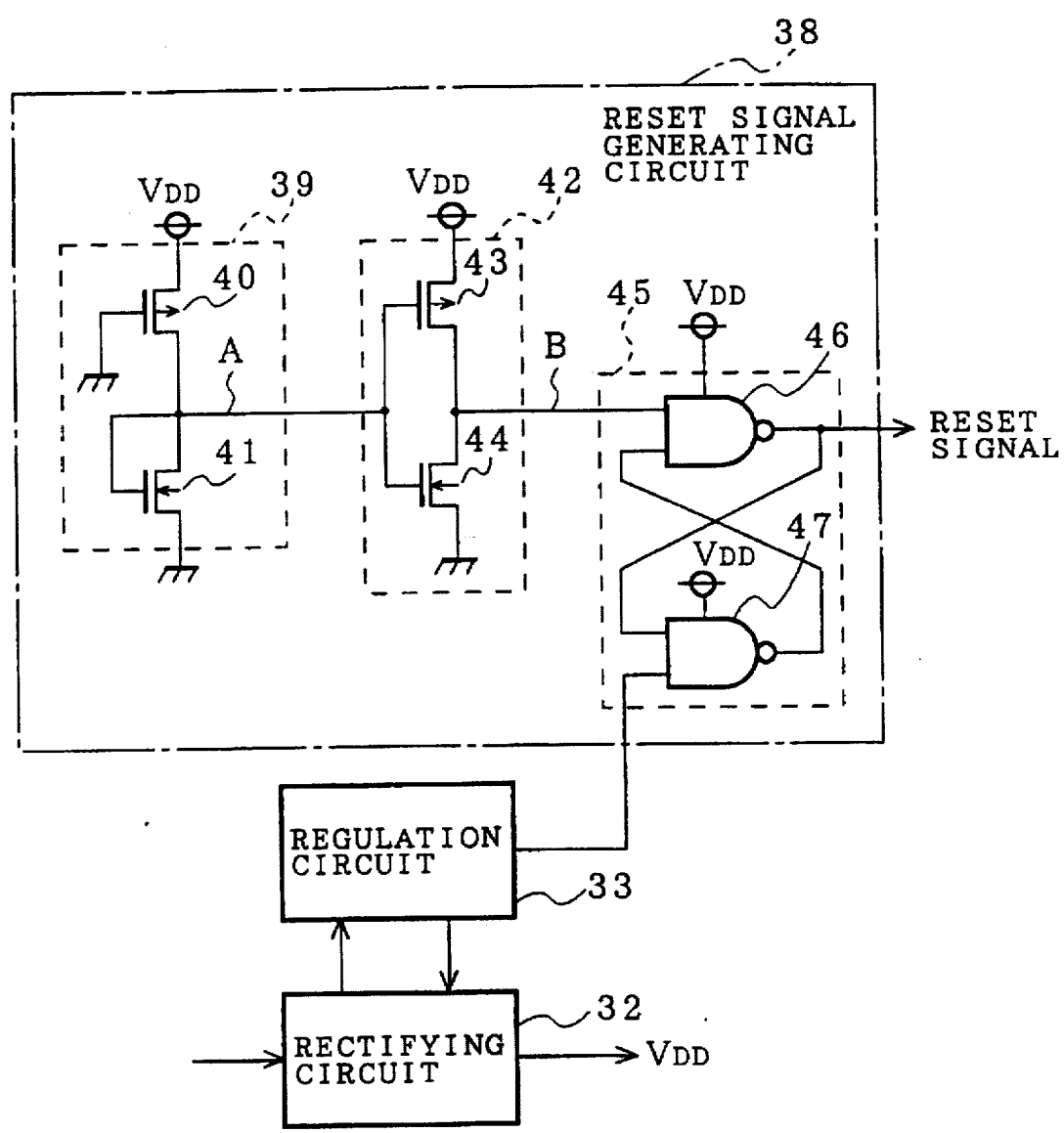
FIG. 2 is a circuit diagram showing the construction of a reset signal generating circuit in FIG. 1.

FIG. 2 is a circuit diagram showing an example of the reset signal generating circuit 38 in the non contact IC card 3a shown in FIG. 1. In FIG. 2, 39 represents an intermediate voltage setting circuit, connected between the power supply voltage $V_{DD}$ and the ground voltage, for setting an intermediate voltage close to a low level, 40 and 41 a P-type MOS transistor and an N-type MOS transistor constituting the intermediate voltage setting circuit 39, 42 an inverter logic circuit having an input for receiving the intermediate voltage, for inverting its output when the power supply voltage is lowered below the minimum voltage ensuring the normal operation of the internal circuits during lowering of the power supply voltage, 43 and 44 a P-type MOS transistor and an N-type MOS transistor constituting the inverter logic circuit 42, 45 a flip flop having a first input for receiving the output of the inverter logic circuit 42, and a second input for receiving the output voltage from the regulation circuit 43, and being operated by the power supply voltage to output a reset signal for the internal circuits, and 46 and 47 a first NAND gate and a second NAND gate which comprise the flip flop 45.

The P-type MOS transistor 40 is constructed by a transistor through which a current is less subject to flow than through the N-type MOS transistor 41, by making the channel length L to be as short as 200 μm and the channel width W to be as narrow as 2.5 μm for example, in order to set the output voltage of the intermediate voltage setting circuit 39 to be the low level. The P-type MOS transistor 43 is also constructed by a transistor through which a current is less subject to flow than through the N-type MOS transistor 44, by making the channel length L to be 100 μm and the channel width W to be 2.5 μm for example.

Next, the operation of the circuits shown in FIG. 1 and FIG. 2 will be described.

Figure 3:
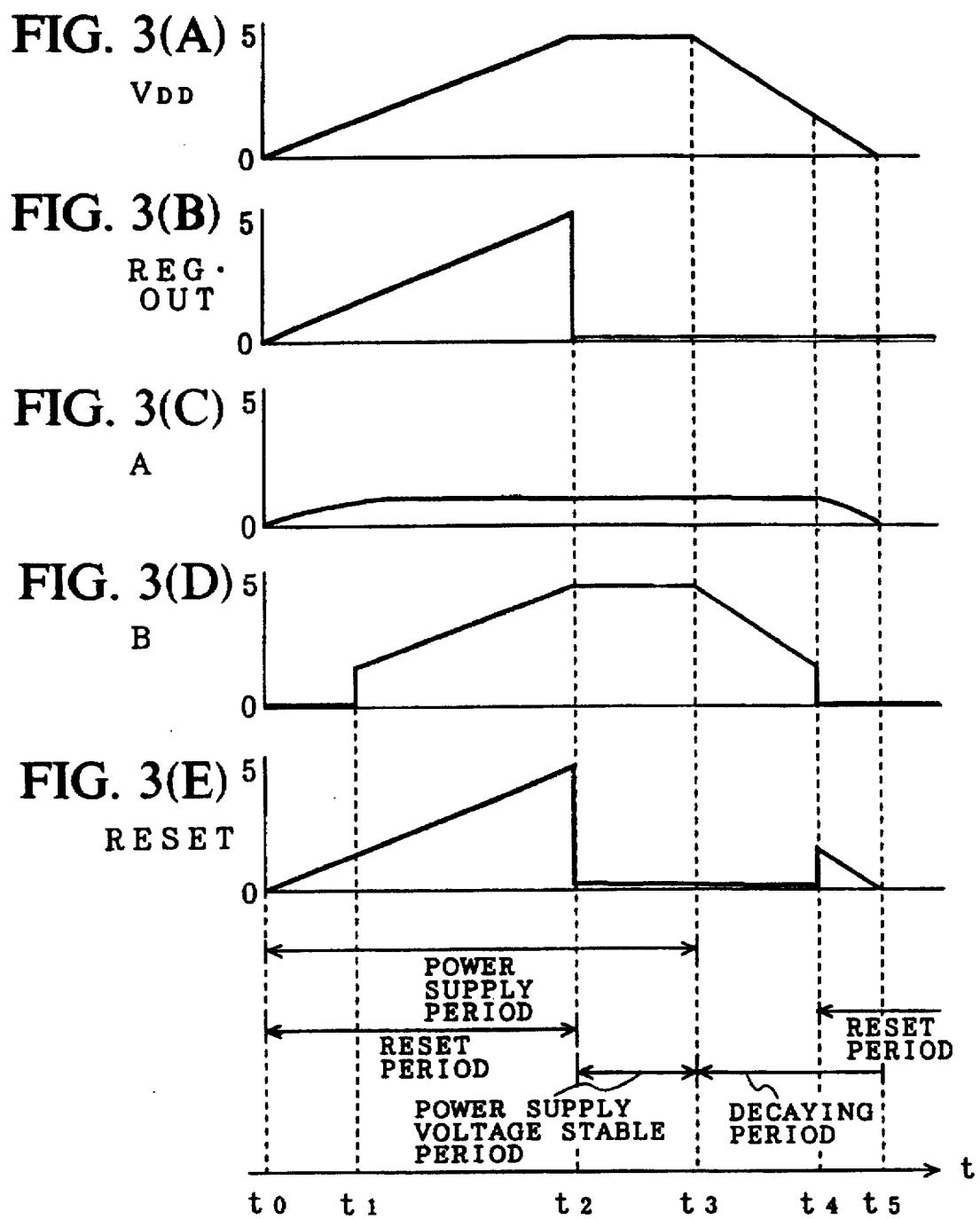
FIGS. 3(A)–3(E) are waveform diagrams showing a change of a voltage in each point in the circuit shown in FIG. 2.

FIGS. 3(A)-3(E) are waveform diagrams for explaining a voltage change at each point in the circuit shown in FIG. 2. First, when the transmitting/receiving antenna 31 in the non contact IC card 3a begins to receive electric waves at a time $t_0$, the input electric waves are rectified by the rectifying circuit 32, and the rectified voltage is charged up by the capacitor therein, so that, as shown in FIG. 3(A), the power supply voltage $V_{DD}$ rises from 0V to the operating voltage of the internal circuits 30 (FIG. 1) of, for example, 5V.

Accompanied by the rise of the power supply voltage $V_{DD}$, the output (Reg. Out) of the regulation circuit 33 and the reset signal, which is the output of the flip flop 45, rise similarly (see FIG. 3(B) and FIG. 3(E)). Since the current through the P-type MOS transistor 40 is less subject to flow, the potential at a point A, which is the output of the intermediate voltage setting circuit 39, becomes 0.6V to 0.8V which is near the low level, as shown in FIG. 3(C). Since the current through the P-type MOS transistor 43 in the inverter logic circuit 42 is also less subject to flow, it is not immediately turned ON even when a voltage nearly equal to the low level is applied to its input, but is turned ON only when the time reaches a time $t_1$. As a result, the potential at a point B, which is the output of the inverter logic circuit 42, becomes almost the same as $V_{DD}$ as shown in FIG. 3(D). Then, the potential at the point B rises in the same way as $V_{DD}$ rises until $V_{DD}$ reaches 5V. During a period from the time $t_0$, which is the start time of receiving the electric waves, to a time $t_2$ when $V_{DD}$ reaches 5V, both inputs of the flip flop 45 are almost the same as $V_{DD}$. Therefore, during this period, the reset signal, which is the output of the flip flop 45, is also almost the same as $V_{DD}$, so that the internal circuits are being reset.

At the time $t_2$ at which $V_{DD}$ reaches the operating voltage of the internal circuits, the regulation circuit 33 operates to lower its output from "H" to "L", whereby the output of the NAND gate 47 turns to "H". To one of the inputs of the NAND gate 46, the voltage $V_{DD}$ at the point B is applied. To the other input of the NAND gate 46, the "H" level which is the output of the NAND gate 47 is applied. Therefore, the output of the NAND gate 46 is turned to "L" to release the reset state.

During a period from the time $t_2$ to a time $t_3$ at which the electric waves received by the non contact IC card 3a stops so that $V_{DD}$ starts to be lowered from 5V, the regulation circuit 33 controls the rectifying circuit 32 to suppress the output voltage of the rectifying circuit 32 so as not to exceed 5V which is the operating voltage of the internal circuits but to be kept constant at 5V. During a power supply voltage stable period between the time $t_2$ and a time $t_3$, various internal circuits in the non contact IC card 3a operate.

Next, when the reception of the electric waves is stopped at the time $t_3$, the power supply voltage $V_{DD}$ starts to drop, and when it drops below a predetermined value at a time $t_4$, the P-type MOS transistor 43 in the inverter logic circuit 42 is turned OFF, and the N-type MOS transistor 44 is turned ON. This is because the P-type MOS transistor 43 comprises a transistor through which a current is less subject to flow than through the N-type MOS transistor 44. As a result, the potential at the point B which is the output of the inverter logic circuit 42 is turned from "H" to "L" so that the reset signal which is the output of the flip flop 45 becomes "H" which is almost the same as the decaying $V_{DD}$. This reset signal is supplied to the various internal circuits in the non contact IC card 3a. The reset signal decays in the similar way as $V_{DD}$ to be 0V at a time $t_5$.

As described above, according to the non contact IC card of this first embodiment, since the reset signal is generated in accordance with the voltage generated in the card, there is an effect in that the reliability in the data processing in the card and the stored data is increased.

Embodiment 2

Figure 4:
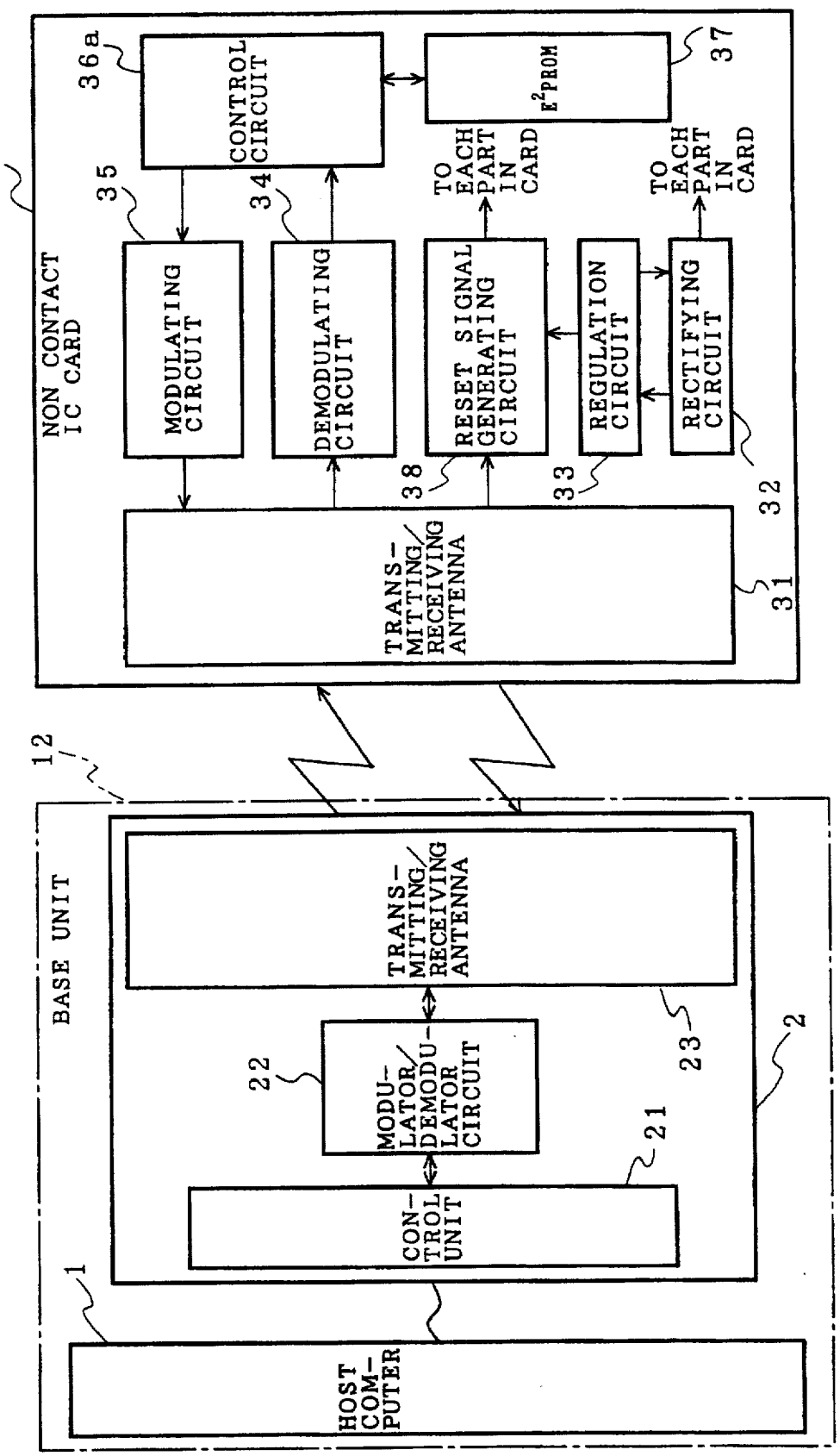
FIG. 4 is a block diagram showing the construction of a non contact IC card system according to a second embodiment of the present invention.
Figure 11:
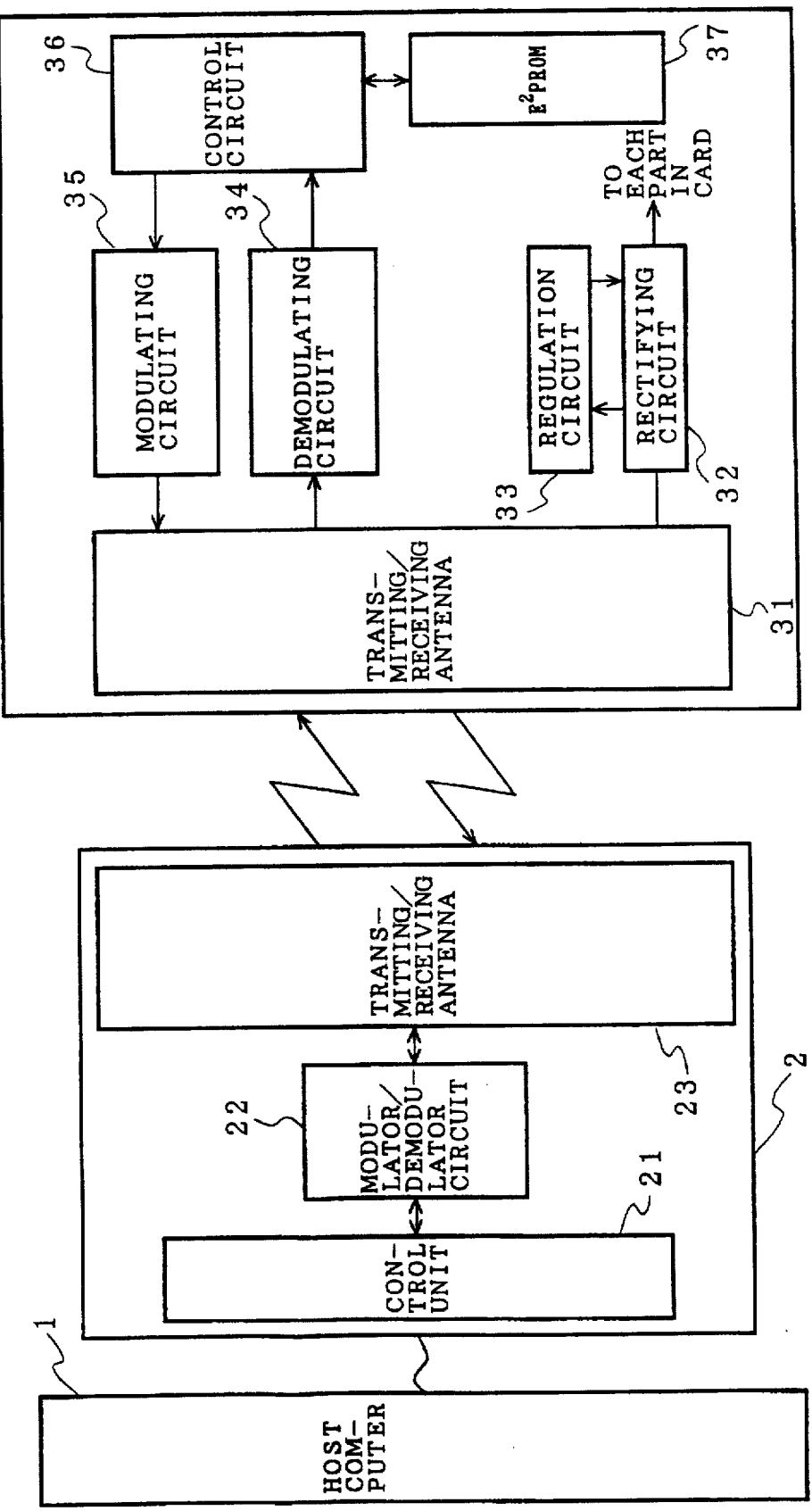
FIG. 11 is a block diagram showing an example of the construction of a conventional non contact IC card system.

FIG. 4 is a block diagram showing of a non contact IC card system according to a second embodiment of the present invention. In the figure, the non contact IC card 3a is the same as the one shown in FIG. 1, and the host computer and the reader/writer are the same as those in the conventional system shown in FIG. 11. Explaining again, 1 represents the host computer, 2 the reader/writer (hereinafter referred to as R/W) electrically connected to the host computer 2 through a cable or the like, 12 a base unit consisting of the host computer 1 and the R/W 2, and 3a the non contact IC card for sending and receiving data by the use of electric waves or the like without having any electrical contact with the R/W 2. In the R/W 2, 21 denotes a control unit, 22 a modulator/demodulator circuit, and 23 a transmitting/receiving antenna. In the non contact IC card 3a, 31 a transmitting/receiving antenna, 32 a rectifying circuit, 33 a regulation circuit, 34 a demodulator circuit, 35 a modulator circuit, 36 a control circuit, and 37 an E²PROM which is a non-volatile memory.

Next, the operation of the non contact IC card system shown in FIG. 4 will be described.

Figure 5:
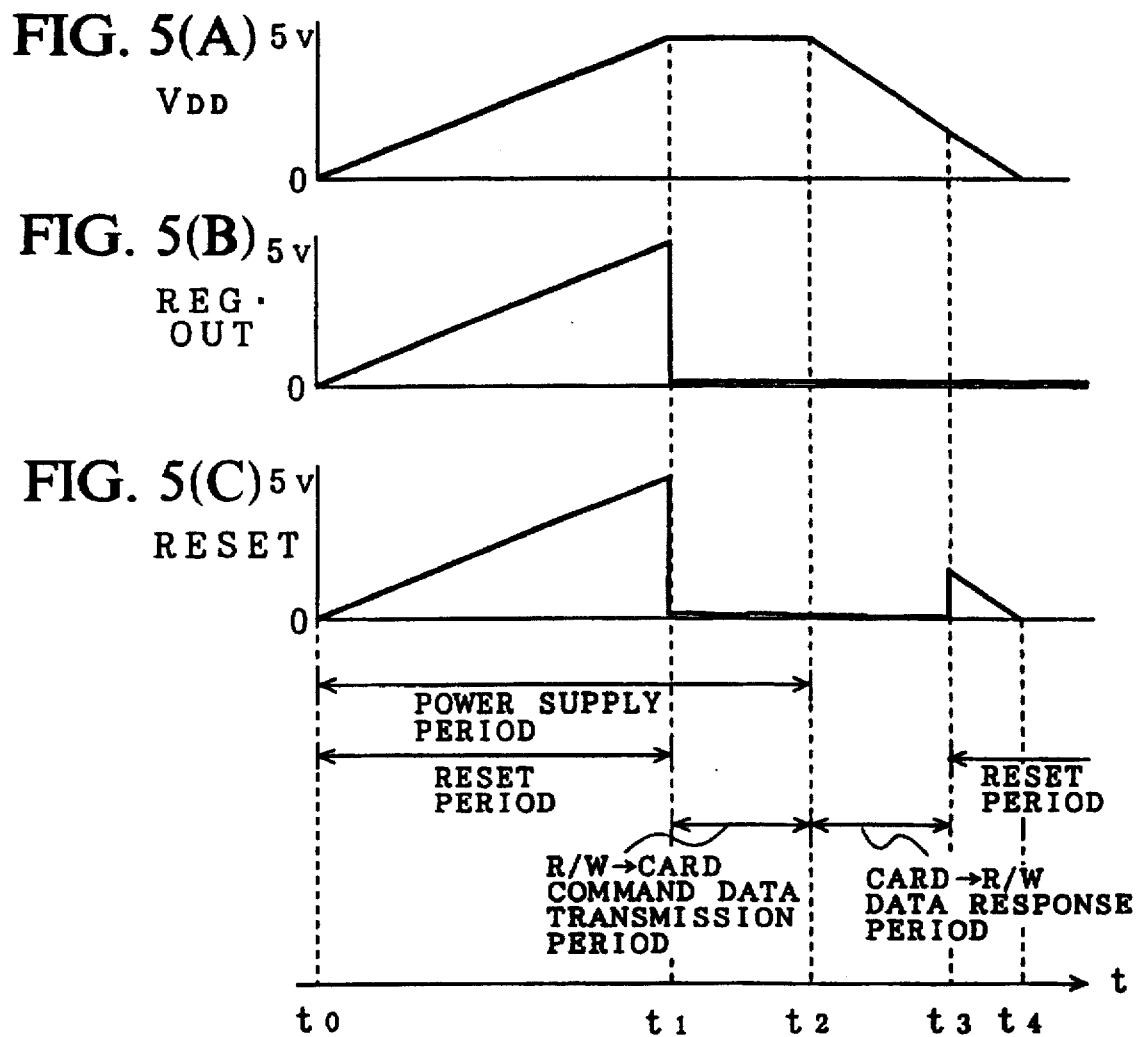
FIGS. 5(A)–5(C) are waveform diagrams showing a change in a voltage at each point in the non contact IC card system shown in FIG. 4.
Figure 6:
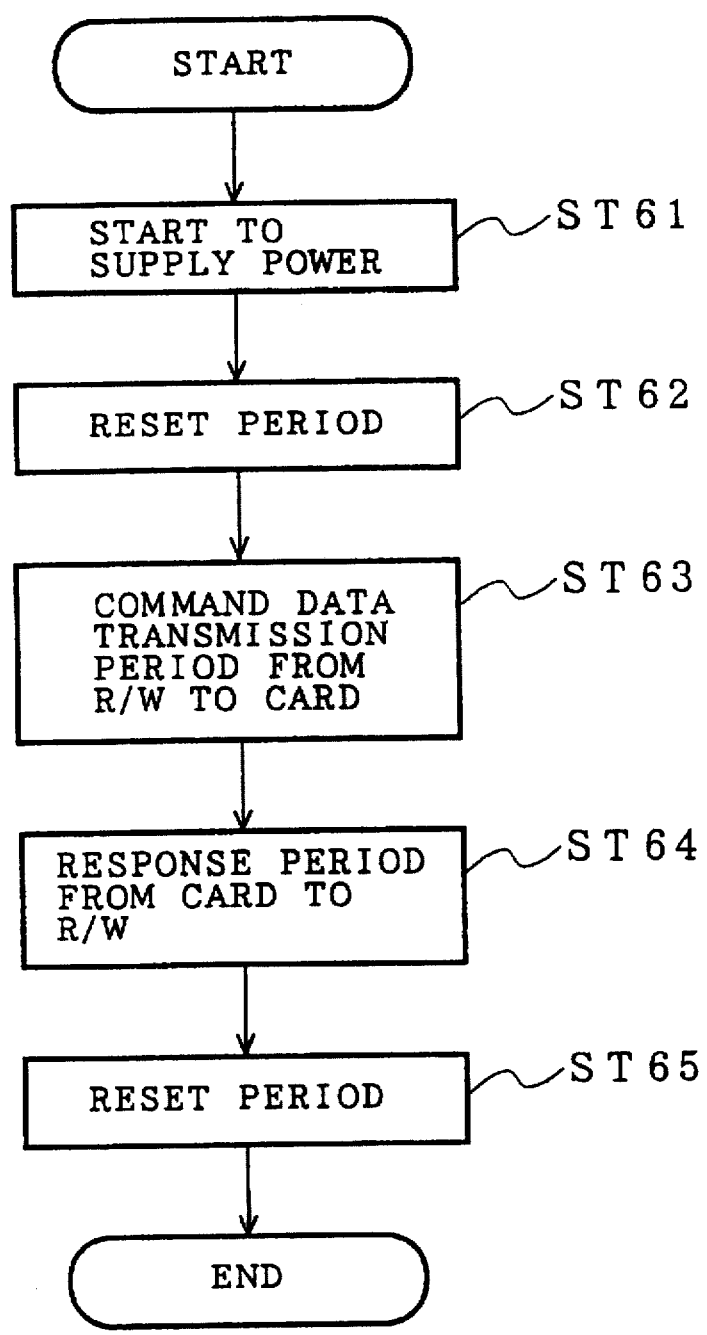
FIG. 6 is a flow chart explaining the operation of the non contact IC card system shown in FIG. 4.

FIGS. 5(A)–5(C) are waveform diagrams of each portion in the non contact IC card 3a during transmitting and receiving data between the R/W 2 and the non contact IC card 3a, and FIG. 6 is a flow chart explaining the operation of the communication between the R/W 2 and the non contact IC card 3a according to the second embodiment. In FIGS. 4, 5(A)–5(C), and 6, when the non contact IC card 3a approaches the R/W 2, the non contact IC card 3a receives the electric waves from the R/W 2 so that the rectifying circuit 32 in the non contact IC card 3a starts to supply the power supply voltage $V_{DD}$. Accompanied by the rise of the power supply voltage $V_{DD}$, the output (Reg. Out) of the regulation circuit 33 and the reset signal also rise so that the various internal circuits in the non contact IC card 3a are reset (from the time $t_0$ to $t_1$ in FIG. 5 and steps ST61 and ST62 in FIG. 6).

Next, when the power supply voltage becomes 5V, the output of the regulation circuit 33 is turned to "L" so that the reset signal is lowered from "H" to "L" to release the reset state (time $t_1$ in FIGS. 5(A)–5(C)). When the reset is released so that the power supply voltage is stabilized to be a constant value, command data is transmitted from the R/W 2 to the non contact IC card 3a (step ST63 in FIG. 6). When the transmission of the command data from the R/W 2 to the non contact IC card 3a is finished, the transmission of the electric waves from the R/W 2 to the non contact IC card 3a is stopped (at the time $t_2$ in FIG. 5), so that the power supply voltage in the non contact IC card 3a begins to be lowered. During this lowering period, response data is transmitted from the non contact IC card 3a to the R/W 2 (step ST64 in FIG. 6). Then when the power supply voltage reaches the minimum voltage of for example 2V which ensures the normal operation of the internal circuits, the reset signal is again generated (at the time $t_3$ in FIGS. 5(A)–5(C)) to make the non contact IC card 3a to be in the reset state so as to finish the processes in the card (step ST65).

According to the non contact IC card system of the second embodiment, since the reset signal is released only when the voltage generated in the non contact IC card reaches 5V when it is rising, or only when the voltage is not lowered, during lowering, below the minimum voltage which ensures the normal operation of the internal circuits, the data communication between the R/W 2 and the non contact IC card 3a and the processing in the non contact IC card 3a is carried out only when the power supply voltage is higher than the predetermined value so that there is an effect in that the reliability in communication can be ensured.

Embodiment 3

Figure 7:
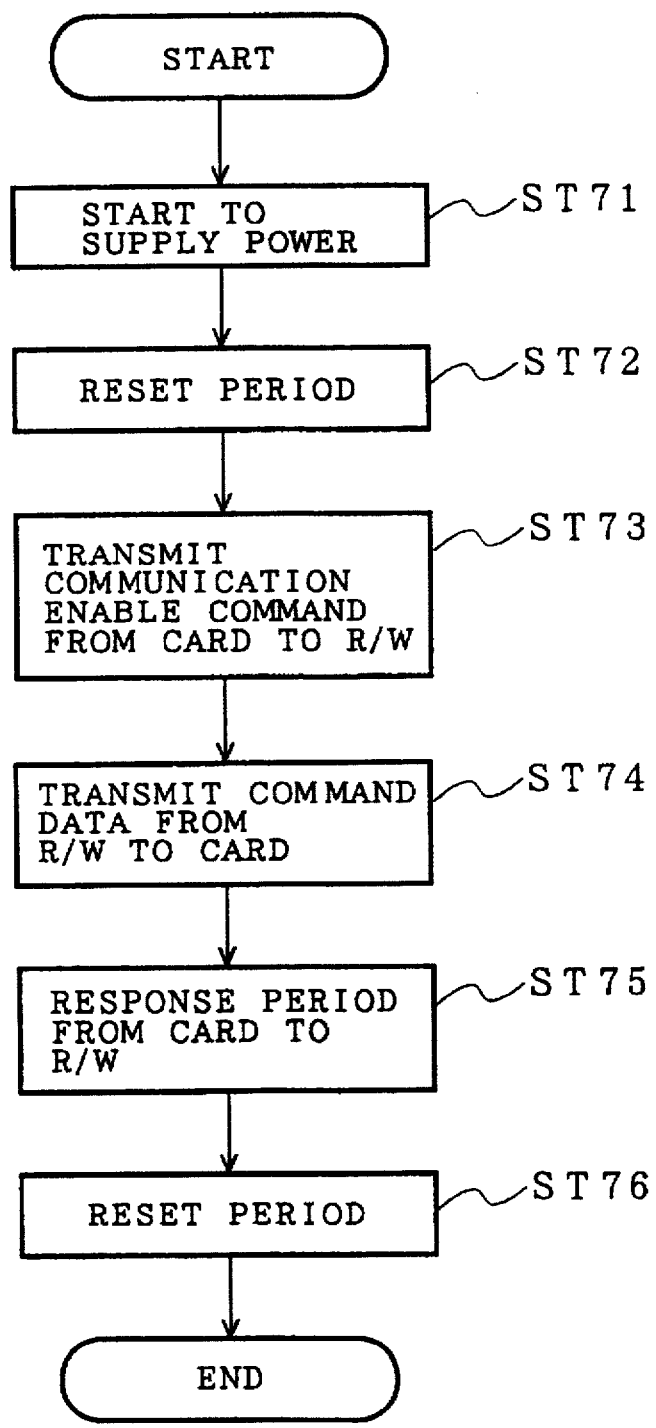
FIG. 7 is a flow chart explaining the operation of the non contact IC card system according to a third embodiment of the present invention.

FIG. 7 is a flow chart explaining the operation of the communication between the R/W 2 and the non contact IC card 3a according to a third embodiment of the present invention. Because the R/W 2 and the non contact IC card 3a in the third embodiment are the same as those in the second embodiment shown in FIG. 4, the drawing for illustrating the construction and its explanation are omitted.

In FIG. 7, when the non contact IC card 3a approaches the R/W 2, the non contact IC card 3a receives the electric waves from the R/W 2 so that the rectifying circuit 32 in the non contact IC card 3a starts to supply the power supply voltage $V_{DD}$. Accompanied by the rise of the power supply voltage $V_{DD}$, the output (Reg. Out) of the regulation circuit 33 and the reset signal also rise so that the various internal circuits in the non contact IC card 3a are reset (from the time $t_0$ to $t_1$ in FIGS. 5(A)–5(C) and steps ST71 and ST72 in FIG. 7).

Next, when the power supply voltage becomes 5V, the output of the regulation circuit 33 is turned to "L" so that the reset signal is lowered from "H" to "L" to release the reset state (time $t_1$ in FIGS. 5(A)–5(C)). When the reset is released so that the power supply voltage is stabilized to be a constant value, the control circuit 36a in the non contact IC card 3a receives the reset releasing signal, and transmits data to inform that the power supply voltage reaches the constant value. In response to the reception of this data, the R/W 2 starts to transmit a command to the non contact IC card 3a (step ST74). After transmitting the command data from the R/W 2 to the non contact IC card 3a, the transmission of the electric waves from the R/W 2 to the non contact IC card 3a is completed, and response data is transmitted from the non contact IC card 3a to the R/W 2 during a period when the power supply voltage in the non contact IC card 3a is lowered (step ST75). Then when the power supply voltage is lowered below the predetermined value of for example 2V, the non contact IC card 3a is again reset (step ST76) so as to finish the transmission and reception.

According to the non contact IC card system of this third embodiment, since the R/W 2 is informed of the fact that the power supply voltage in the non contact IC card reaches 5V during rising, the power supply voltage in the non contact IC card 3a is surely stable when transmission is effected from the R/W 2 to the non contact IC card 3a so that there is an effect in that the reliability in communication is increased. In addition, in the time for the power supply voltage to reach the predetermined value, since the margin which was necessary in the conventional system is not necessary in this embodiment, the communicating time in the system is shortened so that there is an effect in that a speed up in the system is achieved.

Embodiment 4

Figure 8:
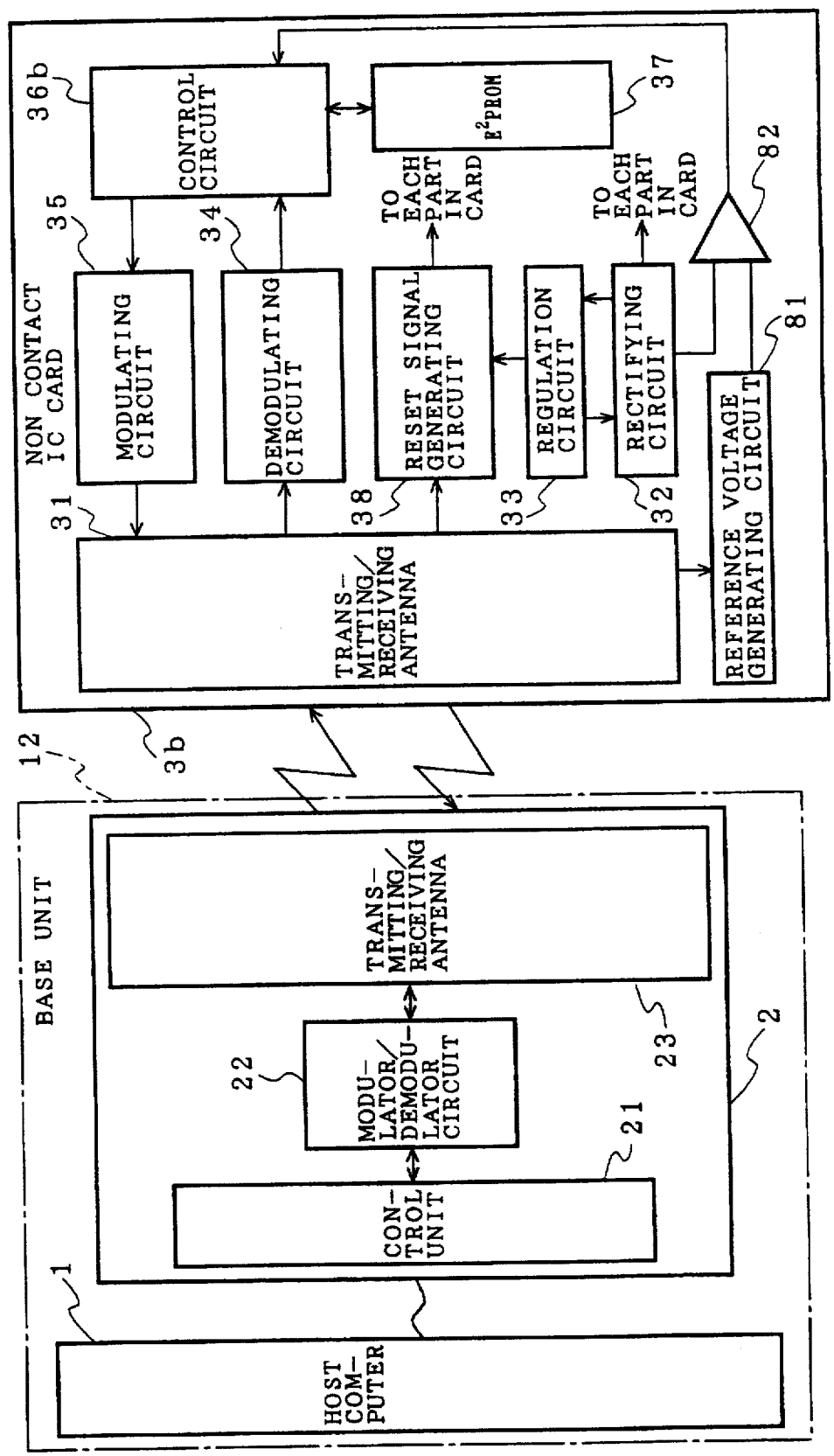
FIG. 8 is a block diagram showing the construction of a non contact IC card system according to a fourth embodiment of the present invention.

FIG. 8 is a block diagram showing a non contact IC card system according to a fourth embodiment of the present invention. The host computer 1 and the R/W 2 in the embodiment mode 4 are the same as those in the second embodiment shown in FIG. 4. In FIG. 8, 3b represents a non contact IC card according to this fourth embodiment, 81 a reference voltage generating circuit, and 82 a comparing circuit included in the non contact IC card 3b. The other construction in the non contact IC card 3b is the same as the construction in the non contact IC card 3a shown in FIG. 4, except that the contents of the control in the control circuit 36b are slightly different from the control in the control circuit 36a.

In the E²PROM 37 which is a nonvolatile memory included as a data memory in the non contact IC card, important data such as money data or the like may be stored depending on its use. When a data write operation is insufficient due to a lowered power supply voltage, the data may be destroyed. In order to prevent this data destruction, the non contact IC card system in this fourth embodiment is the system in which, when data write process to the E²PROM 37 becomes impossible due to the lowering of the voltage, the fact is informed by the use of electric waves or the like from the non contact IC card 3b to the R/W 2.

Next, the operation of the non contact IC card system shown in FIG. 8 will be described.

In accordance with an input of the electric waves received through the transmitting/receiving antenna 31, the reference voltage generating circuit 81 generates a voltage, which is the minimum voltage of, for example, 4.5V to write data into the E²PROM 37. The generated voltage is input to one of the inputs of the comparator 82. To the other input of the comparator 82, the power supply voltage $V_{DD}$ from the rectifying circuit 32 is input. The output state of the comparator 82 is inverted when the power supply voltage is lowered below 4.5V. The output of the comparator 82 is input to the control circuit 36b. When data write in process into the E²PROM 37 is to be carried out during data transmission and reception between the R/W 2 and the non contact IC card 3b, the control circuit 36 determines whether or not the write operation to the E²PROM 37 is possible in accordance with the state of the output of the comparator 82. When data write in operation is impossible, the control circuit 36b responds to the R/W 2 by sending a command indicating that the write operation is impossible.

In the above example, a determination is made as to whether or not a write operation is possible by referring the output of the comparing circuit 82 when the write operation is to be executed. Alternatively, by supplying the output of the comparing circuit 82 as an interruption input to the control circuit 36b when the power supply voltage is always below a predetermined value of, for example, 4.5 V, the same effect can be obtained by sending, even in a time other than the period of a write operation to the E²PROM 37 is to be executed, a command indicating that any write operation from the non contact IC card 3b to the R/W 2 is impossible when the power supply voltage is below the minimum value of voltages at which any write operation is possible.

According to the non contact IC card system of this fourth embodiment, since a response indicating that the data write in to the E²PROM 37 is impossible is sent from the non contact IC card to the R/W 2, there are effects in that the reliability in writing operation to the data memory in the non contact IC card can be increased, the function of the non contact IC card system can be made superior, and the reliability of the system can be increased.

Embodiment 5

Figure 9:
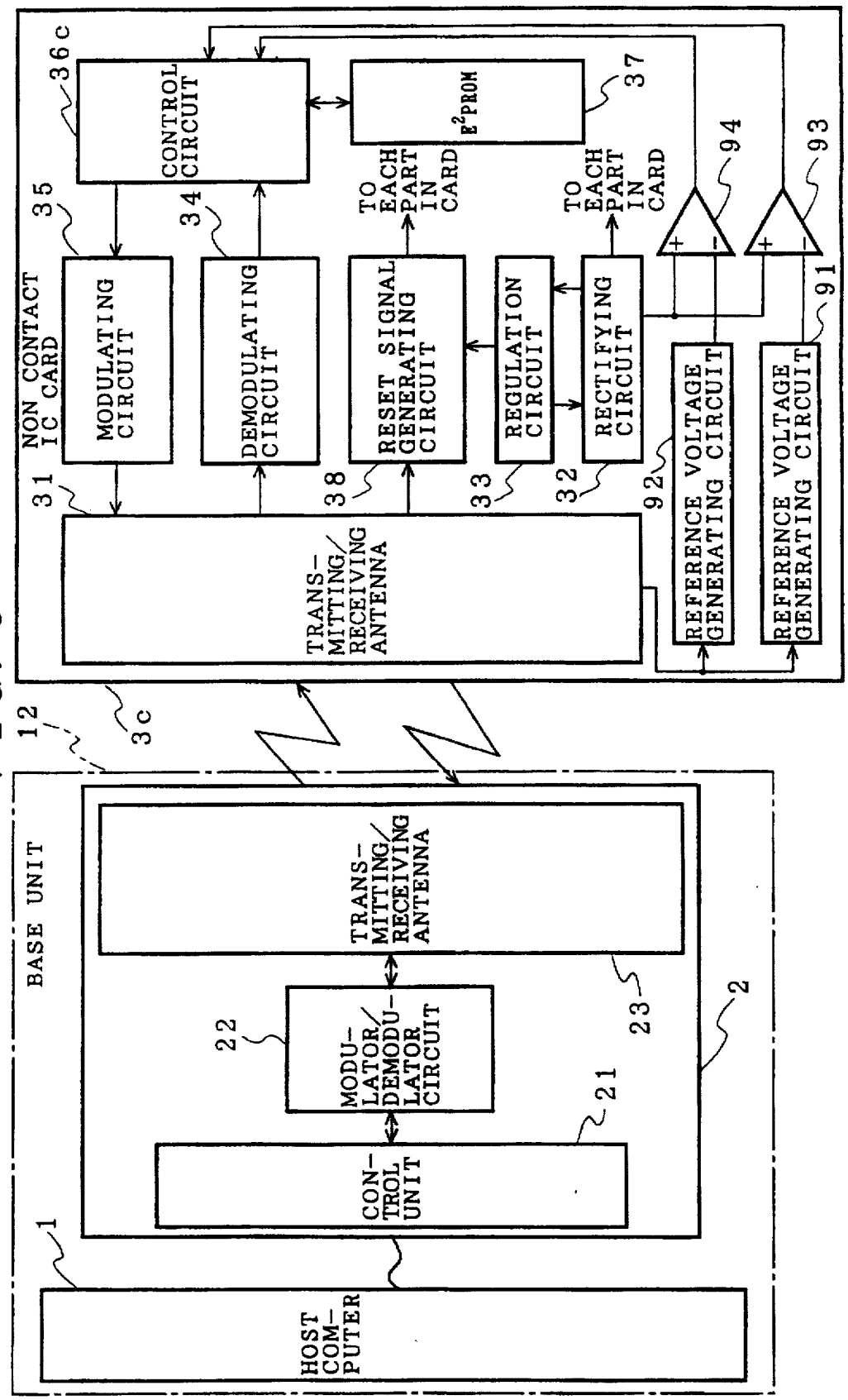
FIG. 9 is a block diagram showing the construction of a non contact IC card system according to a fifth embodiment of the present invention.

FIG. 9 is a block diagram showing a non contact IC card system according to a fifth embodiment of the present invention. The host computer 1 and the R/W 2 in the fifth embodiment are the same as those in FIG. 4. In FIG. 9, 3c represents the non contact IC card according to this fifth embodiment, 91 and 92 denote two reference voltage generating circuits included in the non contact IC card 3c, and 93 and 94 represent two comparing circuits included in the non contact IC card 3c. The other construction in the non contact IC card 3c is the same as the construction in the non contact IC card 3b shown in FIG. 8, except that the contents of the control data in the control circuit 36c are slightly different from the control data in the control circuit 36b in FIG. 8.

The non contact IC card system in this fifth embodiment is the system in which the state of the power supply voltage in the non contact IC card 3c is supervised, and the state of the power supply voltage in the non contact IC card 3c is transmitted to the R/W 2 in accordance with a request from the R/W 2. In the following embodiment, a case is described as an example in which a determination is made as to whether the power supply voltage exceeds 5V and whether it is below 4.5V.

Next, the operation of the system shown in FIG. 9 will be described.

In accordance with an input of the electric waves received through the transmitting/receiving antenna 31, the first reference voltage generating circuit 91 generates the minimum voltage of, for example, 4.5V in the voltages by which a write operation to the E²PROM 37 is possible. The generated voltage is input to one of the inputs of the comparing circuit 93. To the other input of the comparing circuit 93, the power supply voltage $V_{DD}$ from the rectifying circuit 32 is input. The second reference voltage generating circuit 92 generates, in accordance with the input of the electric waves received through the transmitting/receiving antenna 31, a voltage of 5V which is the voltage equal to the operating voltage of the internal circuits, and outputs it to one of the inputs of the comparing circuit 94. To the other input of the comparing circuit 94, the power supply voltage $V_{DD}$ from the rectifying circuit 32 is input.

The state of the output of the comparator 93 is inverted when the power supply voltage output from the rectifying circuit 32 is below 4.5V. Similarly, the output of the comparator 94 is inverted when the power supply voltage output from the rectifying circuit 32 exceeds 5V. The outputs of the comparators 93 and 94 are input to the control circuit 36c. Upon receiving, from the R/W 2, a command to recognize the state of the power supply voltage in the non contact IC card 3c, the control circuit 36c informs the R/W 2 of the state of the power supply voltage in accordance with the outputs of the comparators 93 and 94.

In the above example, the system is the one in which only two cases, i.e., a first case in which the output of the comparing circuit 93 is lowered below 4.5V and a second case in which the output of the comparing circuit 94 exceeds 5V, are supervised. Alternatively, it is possible to provide a system which supervises more cases of the power supply voltages by increasing the number of the reference voltage generating circuits and the comparing circuits.

According to this fifth embodiment, since the R/W 2 can know the power supply voltage in the non contact IC card 3c in accordance with necessity, there is an effect in that a system with higher reliability and higher function can be realized in data transmission and reception between the R/W 2 and the non contact IC card 3c, such as in selecting next command data to be transmitted to the non contact IC card 3c by supervising the state of the voltage in the non contact IC card 3c.

Embodiment 6

Figure 10:
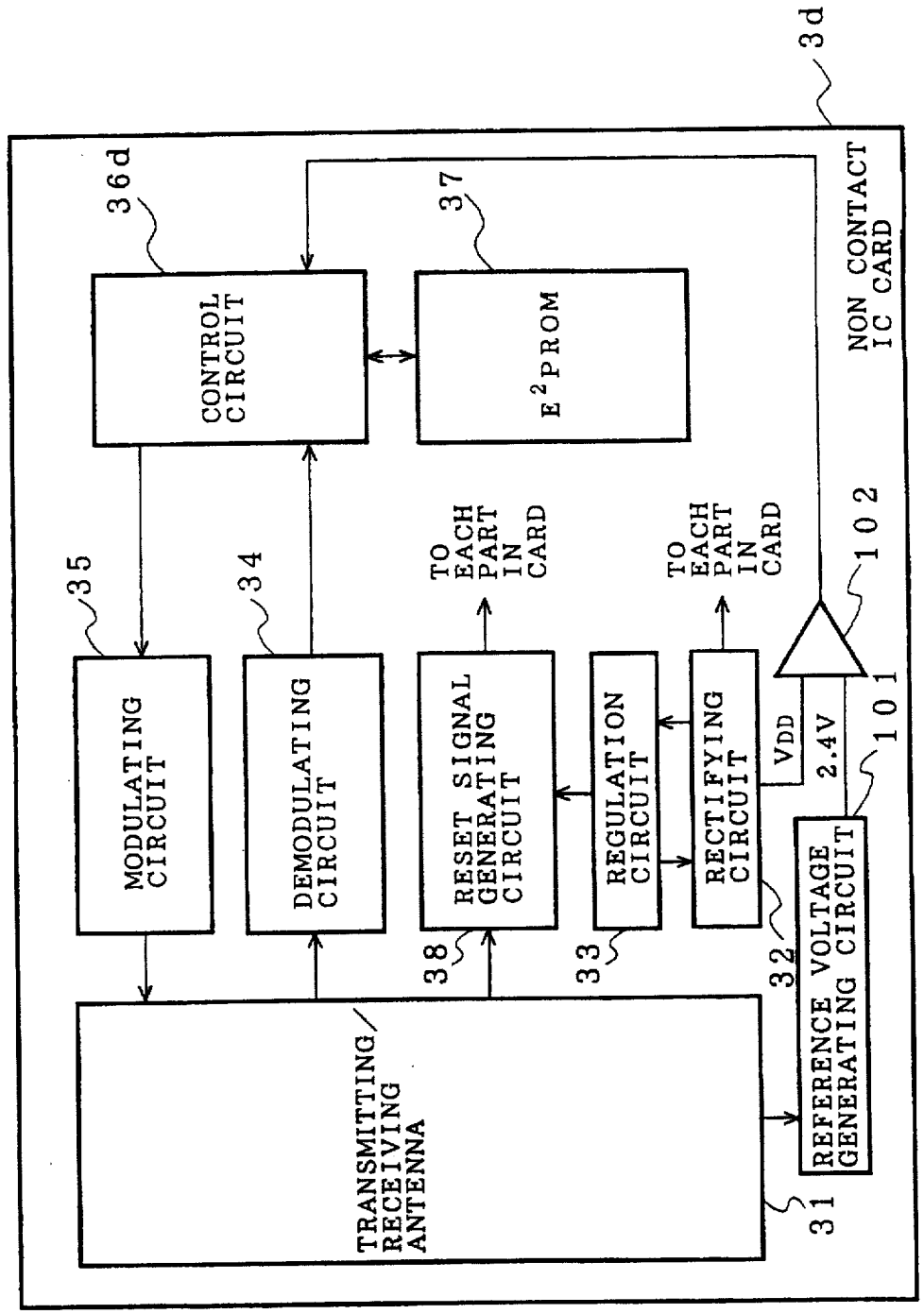
FIG. 10 is a block diagram showing the construction of a non contact IC card according to a sixth embodiment of the present invention.

FIG. 10 is a block diagram showing a non contact IC card according to a sixth embodiment of the present invention. In FIG. 10, 3d represents the non contact IC card according to this sixth embodiment, 101 a reference voltage generating circuit included in the non contact IC card 3d, and 102 a comparator included in the non contact IC card 3d. The other construction in the non contact IC card 3d is the same as that in the non contact IC card 3a in the first embodiment shown in FIG. 1, except that the contents of the control in the control circuit 36d are slightly different from the control in the control circuit 36a.

The non contact IC card according to this sixth embodiment is the one which generates, when the power supply voltage in the card is lowered, an interruption to the control circuit 36d before it is reset.

Next, the operation of the non contact IC card shown in FIG. 10 will be described.

In accordance with an input of the electric waves received through the transmitting/receiving antenna 31, the reference voltage generating circuit 101 generates a voltage slightly higher than a reset voltage of the internal circuits, and outputs it to one of the inputs of the comparing circuit 102. For example, when the power supply voltage $V_{DD}$ for generating the reset signal during lowering of the power supply voltage is 2V, the reference voltage generating circuit 101 generates a voltage of, for example, 2.5V, which is slightly higher than that. To the other input of the comparing circuit 102, the power supply voltage $V_{DD}$ from the rectifying circuit 32 is input. When the power supply voltage is lowered below 2.5V, the output of the comparing circuit 102 is inverted. The output of the comparing circuit 102 is input to the control circuit 36d. The control circuit 36d receives the inverted state signal from the comparing circuit 102 as an interrupting signal to execute a finishing process in the non contact IC card 3d before the internal circuits in the non contact IC card 3d are reset. Accordingly, similar to the first embodiment, the internal circuits are reset.

According to the non contact IC card of this sixth embodiment, since the control circuit can know that the internal circuits will be reset before they are actually reset, and the reset state can be realized only after the executing processes are finished, there is an effect in that the reliability of the processing within the card is increased.

As described above, according to the first aspect of the present invention, since it is so constructed that a reset signal is generated in accordance with a generated voltage in the non contact IC card, the reliability in the data processing and the stored data is increased.

According to the second aspect of the present invention, since the reset signal generating circuit is constructed by a logic circuit, there is an effect in that the reliability in the data processing and the stored data is more surely increased.

According to the third aspect of the present invention, since wireless data transmission and reception are carried out between the non contact IC card and a base unit, the data communication between the base unit and the non contact IC card and the processing in the non contact IC card are executed only when the power supply voltage exceeds a predetermined value, so that there is an effect in that the reliability in communication can be ensured.

According to the fourth aspect of the present invention, since the non contact IC card is so constructed as to detect the fact that the power supply voltage rises at the start of receiving power to reach a predetermined operating voltage and notifies it to a base unit, and, after receiving the notice, the base unit starts to transmit command and data, the power supply voltage in the non contact IC card is surely stabled when transmission is to be effected from the base unit to the non contact IC card, so that there is an effect in that the reliability in communication is increased. In addition, since a margin in the conventional system is not necessary in the time for the power supply voltage to reach the predetermined value, the communicating time in the system is shortened so that there is an effect in that a speed up in the system is achieved.

According to the fifth aspect of the present invention, since the fact that the power supply voltage exceeds a voltage necessary for write operation on the memory is detected and is transmitted to the base unit, and the base unit starts to transmit command and data after receiving the notice from the control circuit, there are effects in that the reliability in the write operation on the memory in the non contact IC card is increased, and in that a system with higher reliability and higher function can be obtained in data transmission and reception between the R/W 2 and the non contact IC card 3c.

According to the seventh aspect of the present invention, since the process in the internal circuits in the non contact IC card is finished in accordance with an interruption notifying that a reset state will occur, by generating the interruption before the power supply voltage is lowered to reset the control circuit and the internal circuits, the control circuit in the card can know that the reset will occur before being turned to the reset state so that the reset state can be realized only after the executing processes are finished, resulting in an effect in that the reliability of the processing within the card is increased.

What is claimed is:

1. A non contact IC card comprising:
    a rectifying circuit for rectifying a power signal received via wireless communication, the rectifying circuit outputting a power supply voltage;
    internal circuitry operated by the power supply voltage; and
    a reset signal generating circuit for resetting said internal circuitry during a period from a time when the power supply voltage begins to rise to a time when the power supply voltage reaches a predetermined operating voltage, and during a period when the power supply voltage begins to decrease below a minimum voltage of voltages which ensure a normal operation of said internal circuitry to a time when the power supply voltage reaches zero, and for releasing the reset during a period other than the period during which the reset is being effected.

2. A non contact IC card comprising:
    a rectifying circuit for rectifying a power signal received via wireless communication, the rectifying circuit outputting a power supply voltage;
    internal circuitry operated by the power supply voltage;
    a regulation circuit for outputting a voltage substantially equal to the power supply voltage during a period from a time when the power supply voltage rises in a power receive starting time to a time when the power supply voltage reaches a predetermined operating voltage necessary to operate said internal circuitry and for maintaining the output voltage at a low level after power supply voltage reaches the predetermined operating voltage, and for controlling said rectifying circuit by maintaining the power supply voltage at the predetermined voltage responsive to the power signal received via wireless communication; and
    a reset signal generating circuit including an intermediate voltage setting circuit for setting an intermediate voltage close to a low level between the power supply voltage and ground voltage, an inverter logic circuit having an input for receiving the intermediate voltage, for inverting its output when the power supply voltage is lowered below the minimum voltage of voltages ensuring the normal operation of the internal circuitry during lowering of said power supply voltage, and a flip-flop having a first input for receiving the output of said inverter logic circuit, a second input for receiving the output voltage from said regulation circuit, and being operated by the power supply voltage to output a reset signal for resetting said internal circuitry.

3. A non contact IC card system for wireless transmission and reception of data between a base unit and a non contact IC card comprising:

a rectifying circuit for rectifying a power signal received from the base unit, said rectifying circuit outputting a power supply voltage, the power supply voltage increasing from the time that the rectifying circuit receives the power signal until the time that the power supply voltage reaches a predetermined voltage, and the power supply voltage beginning to decrease at a time when the rectifying circuit does not receive a power signal from the base unit;

internal circuitry operated by the power supply voltage; and a reset signal generating circuit for resetting said internal circuitry during a period from a time when the power supply voltage begins to rise to a time when the power supply voltage reaches a predetermined operating voltage and during a period when the power supply voltage drops below a minimum voltage of voltages which ensure a normal operation of said internal circuitry during the decay of the power supply voltage at the end of receiving the power signal, and for releasing the reset during a period other than the period during which the reset is being effected.

4. The non contact IC card system as claimed in claim 3, wherein said internal circuitry in the non contact IC card comprises a control circuit for detecting that said power supply voltage reaches a predetermined operating voltage from a rising at the start time of receiving said power signal so as to notify said base unit, said base unit comprising a control unit for starting command and data transmission after receiving said notice from said control circuit.

5. The non contact IC card system as claimed in claim 3, wherein said internal circuitry in said non contact IC card comprises a memory in which a write operation is possible only when the power supply voltage is higher than a predetermined value, and a control circuit for detecting that the power supply voltage reaches said predetermined value to inform to said base unit, and said base unit comprises a control unit for starting transmission of command and data after the information is received from said control circuit.

6. The non contact IC card system as claimed in claim 3, wherein said base unit comprises a control unit for requesting said non contact IC card to transmit a level of the power supply voltage, and said internal circuitry in said non contact IC card comprises comparing means for comparing the power supply voltage with a plurality of reference voltages in accordance with a request from said control unit, and a control circuit for informing the level of said power supply voltage to said base unit based on the compared result by said comparing means.

7. A non contact IC card comprising:

a rectifying circuit for rectifying a power signal received via wireless communication, said rectifying circuit outputting a power supply voltage;

a control circuit operated by the power supply voltage;

internal circuitry controlled by said control circuit;

a reset signal generating circuit for resetting said control circuit and said internal circuitry during a period from a time when the power supply voltage rises in a power receive starting time to a time when the power supply voltage reaches a predetermined operating voltage and during a period when the power supply voltage is below a minimum voltage of voltages which ensure a normal operation of said internal circuitry during the decay of the power supply voltage at the end of receiving the power signal; and interrupting means for generating an interruption in said control circuit before the power supply voltage is lowered to reset said control circuit and said internal circuitry so as to inform said control circuit that it will be in a reset state, wherein said control circuit finishes the process of said internal circuits in accordance with the interruption from said interrupting means.

8. The non-contact IC card of claim 1 wherein the predetermined operating voltage includes the operating voltage of said internal circuitry.

9. The non-contact IC card of claim 1 wherein the predetermined operating voltage is 5 volts.

* * * * *